(12) United States Patent  
Jeong et al.

(10) Patent No.: US 11,454,364 B2
(45) Date of Patent: Sep. 27, 2022

(54) LAMP FOR AUTOMOBILE AND AUTOMOBILE INCLUDING THE SAME

(71) Applicant: HYUNDAI MOBIS CO., LTD., Seoul (KR)

(72) Inventors: Seok Ho Jeong, Yongin-si (KR); Gil Won Han, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/358,547

(22) Filed: Jun. 25, 2021

(65) Prior Publication Data

US 2022/0003374 A1  Jan. 6, 2022

(30) Foreign Application Priority Data

Jul. 1, 2020 (KR) .......................... 10-2020-0081144

(51) Int. Cl.
| | |
|---|---|
| *F21S 41/176* | (2018.01) |
| *F21S 41/32* | (2018.01) |
| *C08K 3/013* | (2018.01) |
| *C08G 77/50* | (2006.01) |
| *C09K 11/02* | (2006.01) |
| *C09K 11/08* | (2006.01) |

(52) U.S. Cl.
CPC ............ *F21S 41/176* (2018.01); *C08G 77/50* (2013.01); *C08K 3/013* (2018.01); *C09K 11/02* (2013.01); *C09K 11/0883* (2013.01); *F21S 41/32* (2018.01)

(58) Field of Classification Search
CPC ...................................................... F21S 41/176
See application file for complete search history.

(56) References Cited

U.S. PATENT DOCUMENTS

| | | | |
|---|---|---|---|
| 7,553,058 B2* | 6/2009 | Chang ..................... | G02B 5/021 362/330 |
| 8,670,087 B2* | 3/2014 | Shin ..................... | H01L 25/0753 349/61 |
| 2007/0001182 A1* | 1/2007 | Schardt .................. | C09K 11/02 313/503 |
| 2007/0031685 A1* | 2/2007 | Ko ...................... | C09K 11/7774 428/323 |

FOREIGN PATENT DOCUMENTS

JP           5953662 B2     7/2016

* cited by examiner

*Primary Examiner* — Vip Patel
(74) *Attorney, Agent, or Firm* — NovoTechIP International PLLC

(57) ABSTRACT

Disclosed are a lamp for an automobile and an automobile including the lamp. According to one aspect of the present disclosure, provided is a lamp for an automobile, the lamp including: a circuit board; a plurality of light sources provided on a top surface of the circuit board; an optical resin layer provided on the top surface of the circuit board and configured to cover the plurality of light sources; and a fluorescent material layer provided in close contact with a top surface of the optical resin layer. The fluorescent material layer includes: a resin matrix; and fluorescent materials dispersed within the resin matrix.

16 Claims, 6 Drawing Sheets

Exemplary Embodiment 1

Exemplary Embodiment 1

LAMP FOR AUTOMOBILE AND AUTOMOBILE INCLUDING THE SAME

CROSS-REFERENCE TO RELATED APPLICATION(S)

This application claims priority from and the benefit of Korean Patent Application No. 10-2020-0081144, filed on Jul. 1, 2020, which is hereby incorporated by reference for all purposes as if set forth herein.

TECHNICAL FIELD

Exemplary embodiments relate to a lamp for an automobile and an automobile including the lamp.

BACKGROUND

Various types of lamps are mounted to the front and rear of an automobile. For example, for a rear combination lamp provided in the rear of the automobile, a back-up lamp, a tail lamp, a stop lamp, and a turn signal lamp may be provided in a single assembly.

Among these lamps, the tail lamp and the stop lamp respectively perform a tail light function to inform a vehicle approaching from behind of a position of the own automobile and a stop light function to inform the vehicle approaching from behind that own automobile is decelerating. It is common for both the tail light and the stop light to emit red light. Here, the tail light is always turned on at night, and thus, in order to smoothly preform the function of the stop light that is turned on when stepping on the brake pedal or the like, the stop light that emits the same color as the tail light needs to be designed to have relatively high luminous intensity.

Meanwhile, lamps for an automobile according to the related art mainly use a direct lighting method of directly distributing light to the outside through an inner lens without using a reflection surface and an indirect lighting method of distributing light by using a reflection surface. For example, the lamp for an automobile using the indirect lighting method includes a reflection surface which is disposed on a front side with respect to a light emission direction of a light source unit that emits light and also formed having curvature. The reflection surface reflects light incident from the light source unit and distributes the light to the outside.

However, an air gap having at least about 15 mm or more is required in an optical system using a direct lighting or indirect lighting method according to the related art. Also, not only the reflection surface but also an inner lens that performs a function of diffusing light is needed, and thus, a degree of freedom in a structure of the lamp for an automobile is limited. Furthermore, when the inner lens was utilized, it was difficult to achieve stop light distribution by the stop light or the like.

Also, recently, research has been actively conducted on lamp optical systems such as organic light emitting diodes (OLEDs) that have surface light source characteristics to achieve various effects including stereo effects and the like, but a significant portion of the OLED lamp optical systems have not satisfied the light distribution regulations (STOP) in North America.

Thus, there is a need to develop the lamp optical system for an automobile which satisfies the stop light distribution regulations while securing appearance quality and a degree of freedom in design.

A related art of the present disclosure is disclosed in Japanese Patent No. 5953662 (published on Jul. 20, 2016, entitled "Headlight for automobile").

SUMMARY

Exemplary embodiments of the present disclosure provide manufacture of a lamp for an automobile, which has excellent flexibility and degree of freedom in design.

Exemplary embodiments of the present disclosure further provide manufacture of a lamp for an automobile, which has excellent light uniformity when turned on.

Exemplary embodiments of the present disclosure further provide manufacture of a lamp for an automobile, which satisfies the stop light distribution regulations and has excellent thermal resistance, yellowing resistance, durability, and reliability.

Exemplary embodiments of the present disclosure further provide manufacture of a lamp for an automobile, which has the simplified structure to increase space utilization and has excellent productivity and economic feasibility.

A first exemplary embodiment of the present disclosure provides a lamp for an automobile, the lamp including: a circuit board; a plurality of light sources provided on a top surface of the circuit board; an optical resin layer provided on the top surface of the circuit board and configured to cover the plurality of light sources; and a fluorescent material layer provided in close contact with a top surface of the optical resin layer, wherein the fluorescent material layer includes: a resin matrix; and fluorescent materials dispersed within the resin matrix.

The lamp may satisfy Equation (1) when P is a distance between the plurality of light sources, T1 is a thickness of the optical resin layer, and T2 is a thickness of the fluorescent material layer.

$$0.1 \leq (T1+T2)/P \leq 2.0 \tag{1}$$

A light-emission peak of each of the light sources may have a wavelength of about 420 nm to about 470 nm.

The fluorescent materials may include red fluorescent materials each having a size of about 1 μm to about 100 μm, and the red fluorescent material may include one or more of a garnet-based fluorescent material, a silicate-based fluorescent material, a nitride-based fluorescent material, and an oxynitride-based fluorescent material.

The fluorescent material layer may include about 50 to 99.9 wt % of the resin matrix and about 0.1 to about 50 wt % of red fluorescent materials.

Each of the optical resin layer and the resin matrix may include an addition reaction-type silicone resin composition, and the addition reaction-type silicone resin composition may include a methyl group-containing silicone composition and a curing catalyst.

The addition reaction-type silicone resin composition may include about 0.0001 to about 5 parts by weight of the curing catalyst per 100 parts by weight of the methyl group-containing silicone composition.

The methyl group-containing silicone composition may include about 65 wt % to about 85 wt % of methyl group-containing polysiloxane, about 13 wt % to about 30 wt % of a methyl group-containing chlorosilane compound, and about 1 wt % to about 8 wt % of methyl group-containing hydrogen polysiloxane.

The fluorescent materials may have a refractive index of about 1.5 or more, and each of the optical resin layer and the resin matrix may have a refractive index of about 1.3 to about 1.8.

The fluorescent materials may have a refractive index of about 1.5 to about 2.5, and each of the optical resin layer and the resin matrix may have a refractive index of about 1.4 to about 1.5.

The lamp may further include an optical filter member, which is provided above the fluorescent material layer and blocks a portion of wavelengths that visible rays emitted from the fluorescent material layer have.

The fluorescent material layer may include a pattern area which is provided on a surface of the fluorescent material layer and in which a groove having a recessed shape is formed.

The pattern area may be provided on an upper surface of the fluorescent material layer.

The optical filter member may be an inner lens or an outer lens.

A second exemplary embodiment of the present disclosure provides an automobile including a lamp for an automobile, wherein the lamp includes: a circuit board; a plurality of light sources provided on a top surface of the circuit board; an optical resin layer provided on the top surface of the circuit board and enclosing the plurality of light sources; and a fluorescent material layer provided in close contact with a top surface of the optical resin layer, wherein the fluorescent material layer includes: a resin matrix; and fluorescent materials dispersed within the resin matrix.

A reflection area configured to reflect the light emitted from the plurality of light sources may be provided on at least a portion of the top surface of the circuit board.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Hereinafter, a lamp for an automobile, and the automobile according to the present disclosure will be described with reference to the drawings.

Lamp for Automobile

Figure 1:
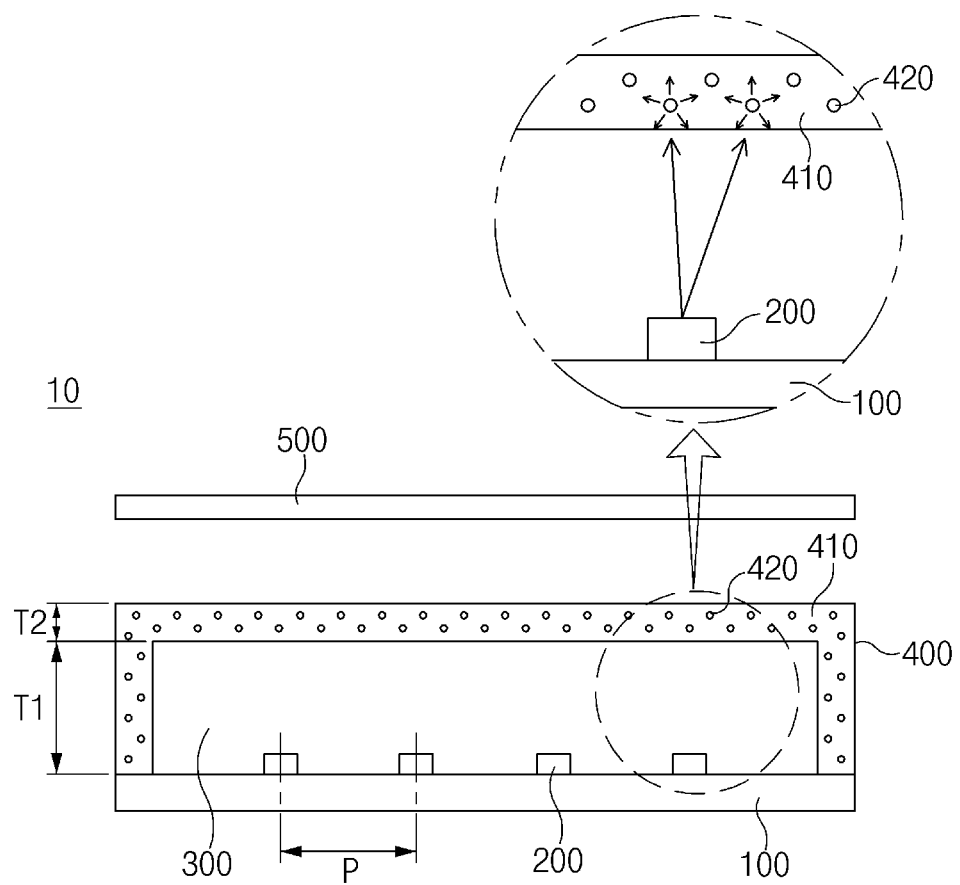
FIG. 1 is a cross-sectional view illustrating a structure of a lamp for an automobile according to an example of the present disclosure.

FIG. 1 is a cross-sectional view illustrating a structure of a lamp for an automobile according to an example of the present disclosure.

As illustrated in FIG. 1, a lamp 10 for an automobile (hereinafter, referred to as a 'lamp') according to the present disclosure may include a circuit board 100 and a plurality of light sources 200 provided on a top surface of the circuit board 100. FIG. 1 illustrates, as an example, a state in which four light sources are provided on a top surface of the circuit board 100. Meanwhile, the circuit board 100 may include a printed circuit board (PCB). For example, the circuit board 100 may include a flexible printed circuit board, and the thickness of the circuit board 100 may be about 0.05 mm to about 5 mm. More preferably, the thickness of the circuit board 100 may be about 0.1 mm to about 1 mm.

Also, the lamp 10 may include: an optical resin layer 300 provided on the top surface of the circuit board 100 and covering the plurality of light sources 200; and a fluorescent material layer 400 provided in close contact with a top surface of the optical resin layer 300. Thus, as illustrated in FIG. 1, the plurality of light sources 200 may be enclosed by the optical resin layer 300. The optical resin layer 300 may be configured to ensure uniformity of light emitted from the plurality of light sources 200 while protecting the plurality of light sources 200 from external impact.

Also, the plurality of light sources 200 may be provided on the top surface of the circuit board 100 through a flip chip method. The flip chip method represents a method in which, when an element such as a light source is attached on a circuit board, the element is bonded as it is through an electrode pattern formed in the circuit board without using a separate connection structure. When the plurality of light sources 200 are provided on the circuit board 100 through the flip chip method, wires attached to the light sources may be removed. Thus, it is possible to improve reliability against external impact or thermal shock, and also it is possible to improve light emitting efficiency of the light source.

Meanwhile, according to the present disclosure, when P is the distance between the plurality of light sources 200 provided on the circuit board 100, P may have a value of about 3 mm to about 10 mm. More preferably, P may be about 4 mm to about 6 mm.

Also, the plurality of light sources 200 may have a predetermined light-emission peak. For example, a light-emission peak of each of the plurality of light sources 200 may have a wavelength of about 420 nm to about 470 nm. For example, the light source 200 may include a blue light emitting diode having a light-emission peak of a wavelength of about 420 nm to about 470 nm.

Meanwhile, according to the present disclosure, Equation (1) may be satisfied when T1 is a thickness of the optical resin layer 300, and T2 is a thickness of the fluorescent material layer 400.

$$0.1 \leq (T1+T2)/P \leq 2.0 \qquad (1)$$

When the condition of Equation (1) is satisfied, the light uniformity of the lamp 10 according to the present disclosure may be improved. As one example, the distance P between the light sources may be equal to T1+T2 that is the sum of the thickness T1 of the optical resin layer 300 and the thickness T2 of the fluorescent material layer 400.

Also, according to the present disclosure, the thickness T1 of the optical resin layer 300 may have a value of about 3 mm to about 10 mm so that the lamp 10 has excellent durability and flexural properties. More preferably, T1 may be about 4 mm to about 6 mm.

Meanwhile, the fluorescent material layer 400 of the lamp 10 according to the present disclosure may include a resin matrix 410 and fluorescent materials 420 dispersed within the resin matrix 410. As illustrated in FIG. 1, the fluorescent materials 420 dispersed within the resin matrix 410 are configured to absorb the light emitted from the plurality of light sources 200, thus simultaneously diffusing light when the light is emitted. Accordingly, the characteristics of a surface light source may be achieved. In this case, it may be advantageous in terms of improvement in light uniformity compared to a case in which a diffusion filter according to the related art is used.

Meanwhile, in order to improve light diffusivity and light uniformity, a refractive index of the fluorescent materials 420 may have a value of about 1.5 or more. More preferably, the refractive index of the fluorescent materials 420 may be about 1.5 to about 2.5.

Also, the fluorescent materials 420 may include red fluorescent materials each having a size of about 1 μm to about 100 μm. Here, the size of each of the fluorescent materials 420 may represent the diameter or maximum length of a particle. Meanwhile, the red fluorescent material may include one or more of a garnet-based fluorescent material, a silicate-based fluorescent material, a nitride-based fluorescent material, and an oxynitride-based fluorescent material. For example, the garnet-based red fluorescent material may include one or more of yttrium aluminum garnet (YAG) and terbium aluminum garnet (TAG). Also, the size of the red fluorescent material may be about 5 μm to about 50 μm.

Figure 2:
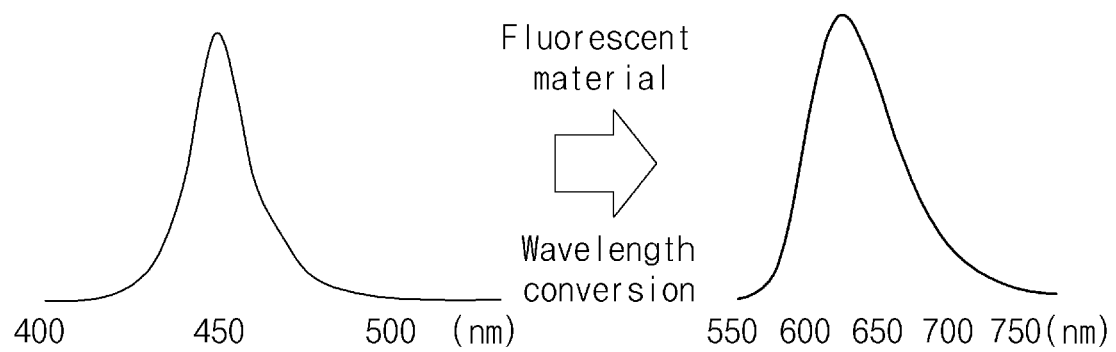
FIG. 2 is a graph showing wavelength conversion of a light source by a fluorescent material of the present disclosure.

FIG. 2 is a graph showing wavelength conversion of a light source by a fluorescent material of the present disclosure.

For example, when each of the light sources 200 of the lamp 10 (see FIG. 1) according to the present disclosure is blue light having the light-emission peak of about 450 nm, and the fluorescent material 420 (see FIG. 1) is a red fluorescent material, it may be confirmed that the wavelength conversion is made from the blue light having the light-emission peak of about 450 nm to the red light having the light-emission peak of about 625 nm as illustrated in FIG. 2.

Meanwhile, according to the present disclosure, each of the optical resin layer 300 and the resin matrix 410 may include an addition reaction-type silicone resin composition. More specifically, the addition reaction-type silicone resin composition may include a methyl group-containing silicone composition and a curing catalyst. The methyl group-containing silicone composition may have excellent formability, flexibility, and thermal resistance and prevent yellowing even when used for a long period of time. Also, it may be advantageous in terms of economic feasibility.

The methyl group-containing silicone composition may include methyl group-containing polysiloxane, a methyl group-containing chlorosilane compound, and methyl group-containing hydrogen polysiloxane.

The methyl group-containing polysiloxane may include one or more of polymethylvinylsiloxane, a dimethylvinyl-terminated dimethylsiloxane copolymer, a methylvinylsiloxane-dimethylsiloxane copolymer, dimethylvinylsiloxy-terminated dimethylsiloxane, a dimethylvinylsiloxy-terminated trimethylsiloxy-terminated dimethylsiloxane-methylvinylsiloxane copolymer, and a trimethylsiloxy-terminated dimethylsiloxane-methylphenylsiloxane-methylvinylsiloxane copolymer. For example, the dimethylvinyl-terminated dimethylsiloxane copolymer may be included. Also, about 65 wt % to about 85 wt % of the methyl group-containing polysiloxane may be included with respect to the total weight of the methyl group-containing silicone composition. In this case, the optical resin layer 300 and the resin matrix 410 may have excellent flexibility, thermal resistance, and reliability. More preferably, about 70 wt % to about 75 wt % of the methyl group-containing polysiloxane may be included.

The methyl group-containing chlorosilane compound may include one or more of dimethylchlorosilane, trimethylchlorosilane, vinyldimethylchlorosilane, and diethylmethylchlorosilane.

Also, about 13 wt % to about 30 wt % of the methyl group-containing chlorosilane compound may be included with respect to the total weight of the methyl group-containing silicone composition. In this case, the optical resin layer 300 and the resin matrix 410 may have excellent crosslinking densities, thermal resistance, and mechanical properties. More preferably, about 15 wt % to about 25 wt % of the methyl group-containing chlorosilane compound may be included.

The methyl group-containing hydrogen polysiloxane may include one or more, for example, two or more silicon-bonded hydrogen groups per one molecule. For example, coupling positions of hydrogen atoms bonded to silicon atoms of the methyl group-containing hydrogen polysiloxane may be at one or more of ends of molecular chains and side chains of the molecular chains. Also, the methyl group-containing hydrogen polysiloxane may include one or more of dimethylhydrogensiloxy-terminated polydimethylsiloxane and a trimethylsiloxy-terminated dimethylsiloxane-methylhydrogensiloxane copolymer.

Also, about 1 wt % to about 8 wt % of the methyl group-containing hydrogen polysiloxane may be included with respect to the total weight of the methyl group-containing silicone composition. In this case, the optical resin layer 300 and the resin matrix 410 may have excellent crosslinking densities, thermal resistance, and mechanical properties.

Also, about 0.001 wt % to about 5 wt % of an additive may be further included with respect to the total weight of the methyl group-containing silicone composition. The additive may include a photostabilizer, a thermostabilizer, an anti-oxidant, an antistatic agent, a lubricant, and a flame retardant.

Meanwhile, the above-described curing catalyst may include one or more of finely divided platinum, platinum black, chloroplatinic acid, alcohol-modified chloroplatinic acid, a chloroplatinic acid-olefin complex, a chloroplatinic acid-alkenylsiloxane complex, and a chloroplatinic acid-divinyltetramethyldisiloxane complex. Here, about 0.0001 to about 5 parts by weight of the curing catalyst may be included per 100 parts by weight of the methyl group-containing silicone composition.

Also, about 0.0001 to about 5 parts by weight of the above-described platinum-based catalyst may be included per 100 parts by weight of the methyl group-containing silicone composition. In this case, a curing reaction rate of the addition reaction-type silicone resin composition may be easily controlled. For example, about 0.01 to about 3 parts by weight of the platinum-based catalyst may be included per 100 parts by weight of the methyl group-containing silicone composition. Also, about 0.03 to about 2 parts by weight of the platinum-based catalyst may be included.

Meanwhile, the resin matrix may have a refractive index of about 1.3 to about 1.8. In an example, the resin matrix may include one or more of polycarbonate, polystyrene, polyolefin, polyester, and polyalkyl(meth)acrylate. More preferably, the refractive index of the resin matrix may be about 1.4 to about 1.5. Also, the refractive index of the resin matrix may be about 1.4 to about 1.42.

Also, the above-described optical resin layer may have the refractive index of about 1.3 to about 1.8. More preferably, the refractive index of the optical resin layer may be about 1.4 to about 1.5.

Also, a difference in refractive indexes between the optical resin layer and the resin matrix of the fluorescent material layer may be about 0.2 or less. In this case, the uniformity of light of the lamp according to the present disclosure may be excellent. For example, the optical resin layer and the resin matrix may include the same kind of addition reaction-type silicone resin composition. In this case, the adhesion between the optical resin layer and the resin matrix may be excellent.

The fluorescent material layer may include about 50 to 99.9 wt % of the resin matrix and about 0.1 to about 50 wt % of red fluorescent materials. In this case, the light uniformity of the lamp may be ensured, and the durability and flexural properties of the fluorescent material layer may also be excellent together.

The thickness T2 of the fluorescent material layer may be about 0.1 mm to about 1 mm. For example, the thickness T2 of the fluorescent material layer may be about 0.3 mm to about 1 mm. In this case, the durability and flexural properties may be excellent.

Meanwhile, as illustrated in FIG. 1, the lamp 10 according to the present disclosure may further include an optical filter member 500, which is provided above the fluorescent material layer 400 and blocks a portion of wavelengths that visible rays emitted from the fluorescent material layer 400 have. That is, the optical filter member 500 may be configured to block a portion of visible rays emitted from the fluorescent material layer 400, and thus, the color of light emitted to the outside is changed.

Figure 3:
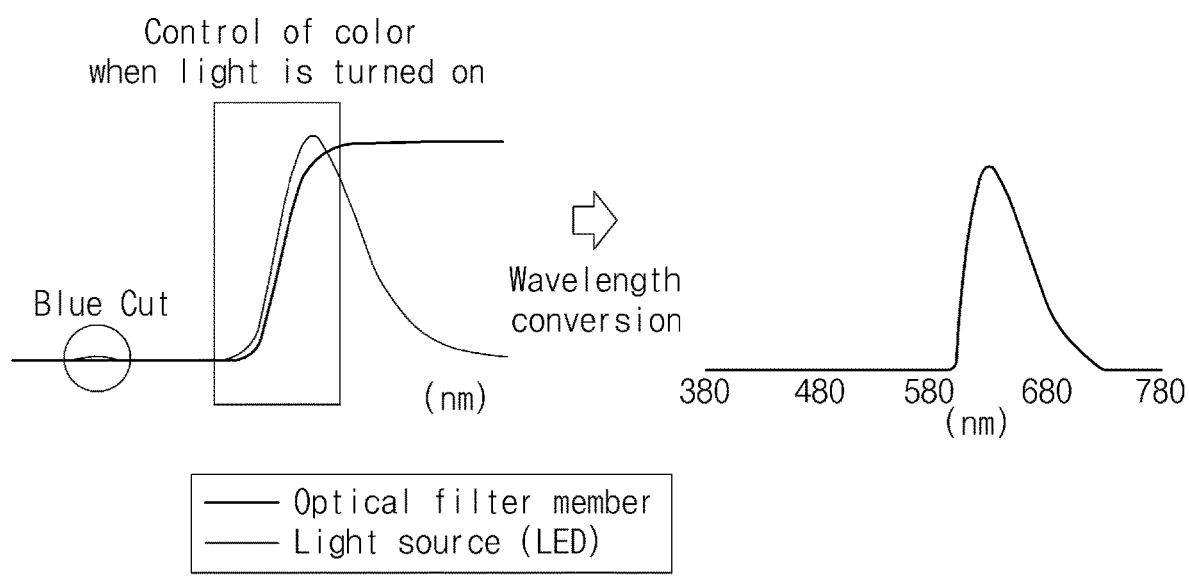
FIG. 3 is a graph showing a wavelength conversion effect when an optical filter member according to the present disclosure is applied.

FIG. 3 is a graph showing the wavelength conversion effect when the optical filter member according to the present disclosure is applied.

The lamp 10 according to the present disclosure may be a lamp mounted to the rear of an automobile. In this case, the light emitted outward from the lamp 10 according to the present disclosure may be red light. In this case, the optical filter member 500 according to the present disclosure may be a red outer lens provided at the outermost portion of the lamp 10. That is, when the optical filter member 500 is the red outer lens, as illustrated in FIG. 3, the light of blue wavelengths among light emitted from the plurality of light sources 200 is blocked, and thus, the red light may be emitted to the outside. Unlike the above, however, the optical filter member 500 may be a red inner lens provided in the inner space of the lamp 10, or may be a component provided separately from an inner lens or an outer lens.

Figure 4:
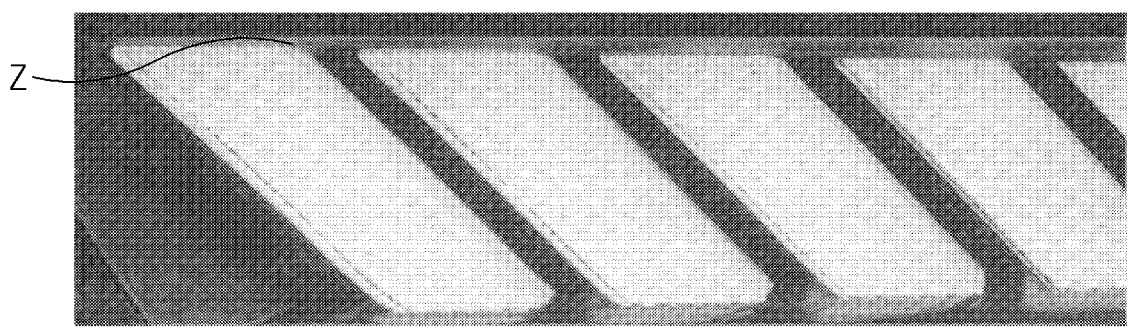
FIG. 4 is a photograph showing a light distribution pattern formed by a lamp for an automobile according to another example of the present disclosure.

FIG. 4 is a photograph showing a light distribution pattern formed by a lamp for an automobile according to an example of the present disclosure.

As illustrated in FIG. 4, a predetermined design Z may be formed in the light distribution pattern formed by the lamp 10 according to the present disclosure. To this end, the fluorescent material layer 400 (see FIG. 1) may further include a pattern area which is provided on a surface of the fluorescent material layer 400 and in which a groove having a recessed shape is formed. More specifically, the pattern area may be provided on an upper surface of the fluorescent material layer 400. For example, this pattern area may be provided by forming a groove area in a die for manufacturing the fluorescent material layer 400, and the groove area has a shape corresponding to the pattern area of the fluorescent material layer 400. However, the pattern area may be manufactured through various methods.

Exemplary Embodiment 1

(1) Manufacture of addition reaction-type silicone resin composition: In order to manufacture an optical resin layer and a resin matrix of a fluorescent material layer, an addition reaction-type silicone resin composition was prepared which includes about 100 parts by weight of a methyl group-containing silicone composition and about 0.001 parts by weight of a curing catalyst (a platinum-based catalyst). The methyl group-containing silicone composition includes about 75 wt % of a dimethylvinyl-terminated dimethylsiloxane copolymer, about 23 wt % of a methyl group-containing chlorosilane compound (one or more of chlorotrimethylsilane and dichloroethylmethylsilane), about 1 wt % of a methyl group-containing hydrogen polysiloxane (a trimethylsiloxy-terminated dimethylsiloxane-methylhydrosilane copolymer), and about 1 wt % of an additive.

(2) Manufacture of a structure in which a circuit board, a plurality of light sources, an optical resin layer, and a fluorescent material layer for a lamp for an automobile are stacked: A flexible PCB having a thickness of about 0.5 mm and a plurality of light sources (blue light emitting diodes having a light-emission peak of about 450 nm) were prepared. The plurality of light sources were arranged on the circuit board at about 5 mm intervals through a flip chip method. The plurality of light sources were enclosed above the circuit board by using an addition reaction-type silicone resin composition, and thus, an optical resin layer having a refractive index of about 1.4 to about 1.5 were formed. Next, a fluorescent material layer were formed on the surface of the optical resin layer, and accordingly, a lamp for an automobile were manufactured.

Here, the fluorescent material layer was manufactured, which includes: about 80 to 99.5 wt % of a resin matrix formed by the addition reaction-type silicone resin composition and having a refractive index of about 1.4 to about 1.5; and about 0.5 to about 20 wt % of red fluorescent materials (nitride-based fluorescent materials having a refractive index of about 1.5 to about 2.5) dispersed in the resin matrix. Also, the lamp was manufactured such that the sum of thicknesses of the optical resin layer and the fluorescent material layer is about 5 mm.

Figure 5:
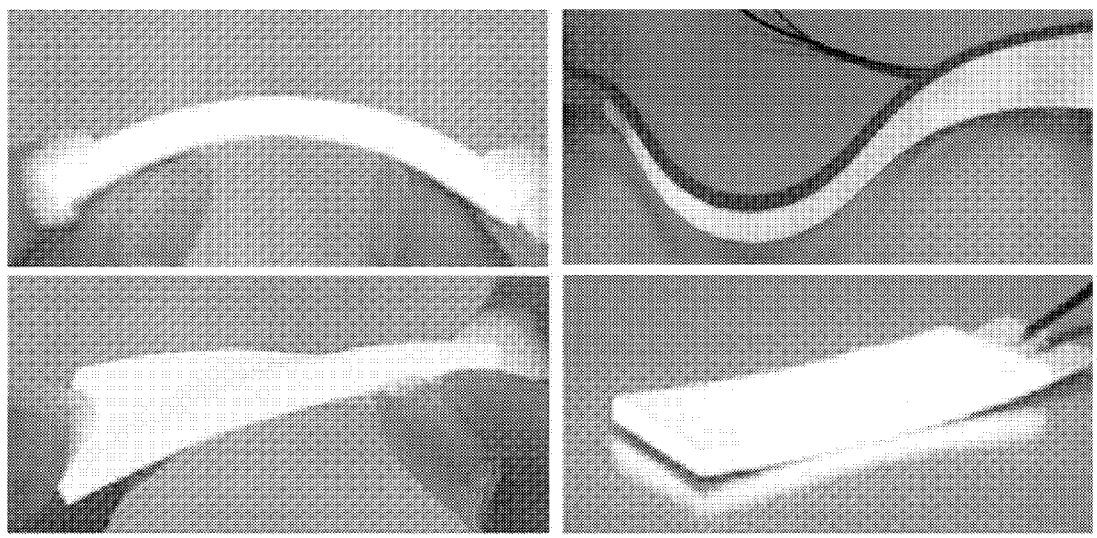
FIG. 5 is a photograph showing a state in which light is emitted from a structure in which a circuit board, a plurality of light sources, an optical resin layer, and a fluorescent material layer, which constitute a lamp for an automobile according to Exemplary Embodiment 1 of the present disclosure, have been stacked.

FIG. 5 is a photograph showing a state in which light is emitted from the structure in which the circuit board, the plurality of light sources, the optical resin layer, and the fluorescent material layer, which constitute the lamp for an automobile according to Exemplary Embodiment 1 of the present disclosure, have been stacked. Referring to FIG. 5, it may be confirmed that the structure of Exemplary Embodiment 1 has the excellent flexible properties while achieving a surface light source and tail and stop light distribution.

Exemplary Embodiment 2

A methyl group-containing silicone composition was applied, which includes about 71 wt % of a dimethylvinyl-terminated dimethylsiloxane copolymer, about 25 wt % of a methyl group-containing chlorosilane compound (one or more of chlorotrimethylsilane and dichloroethylmethylsilane), about 2 wt % of a methyl group-containing hydrogen polysiloxane (a trimethylsiloxy-terminated dimethylsiloxane-methylhydrosilane copolymer), and about 2 wt % of an additive. A structure was manufactured through the same method as Exemplary Embodiment 1 except for the above composition.

(3) Manufacture of lamp for automobile: Lamps for an automobile, which include the structures manufactured through Exemplary Embodiment 1 and Exemplary Embodiment 2, were manufactured.

In a surface light source using a 3-dimensional lens according to the related art, a plurality of lenses and LED light sources were required. Accordingly, space efficiency was deteriorated due to an increase in the thickness of an optical system, economic feasibility was not obtained due to difficulties in injection molding and assembly of the lenses, and the lenses could not be used as stop light due to low light efficiency per unit area.

Figure 6:
FIG. 6 is a photograph showing a state in which the lamp for an automobile according to Exemplary Embodiment 1 of the present disclosure is applied to the automobile.

FIG. 6 is a photograph showing a state in which the lamp for an automobile according to Exemplary Embodiment 1 of the present disclosure is applied to the automobile.

Referring to FIG. 6, slimming down of a lamp module may be achieved in the lamp for an automobile according to Exemplary Embodiment 1 so as to follow recent design trends. Also, an assembly process for the lamp module may be simplified, and production costs may be reduced by the compact lamp. Furthermore, it may be confirmed that geometrical shapes, which were impossible according to the related art, may be easily achieved.

(4) Thermal shock test: Bending thermal shock tests of LG Innotek Co., Ltd. were performed on the structures of the lamps for an automobile according to Exemplary Embodiment 1 and Exemplary Embodiment 2. Particularly, the structure manufactured according to Exemplary Embodiment 1 was held at about −40±3° C. for about 10 minutes and then held at about −85±3° C. in a heating rate of about 12° C./min for about 10 minutes. This process was defined as one cycle, and 1000 cycles were repeated. Then, luminous flux was measured after turning on the structure according to Exemplary Embodiment 1 and compared with luminous flux when turned on before the thermal shock test. The structure was determined to be acceptable if the luminous flux is reduced to about 20% or less, and it was observed with naked eyes and evaluated whether discoloration, fading, swelling, or cracking of the sample occur or not. As a result, for the structures manufactured according to Exemplary Embodiment 1 and Exemplary Embodiment 2, the luminous flux when light is turned on after the thermal shock test was reduced to about 2.2% or less compared to the luminous flux before the thermal shock test. Also, discoloration, fading, swelling, or cracking did not occur.

Automobile

An automobile according to the present disclosure may include a lamp 10 for an automobile (hereinafter, referred to as a 'lamp'). Here, the lamp 10 may be a lamp provided in the rear of the automobile. Here, the lamp 10 may include: a circuit board 100; a plurality of light sources 200 provided on a top surface of the circuit board 100; an optical resin layer 300 provided on the top surface of the circuit board 100 and enclosing the plurality of light sources 200; and a fluorescent material layer 400 provided in close contact with a top surface of the optical resin layer 300. Here, the fluorescent material layer 400 may include a resin matrix 410 and fluorescent materials 420 dispersed within the resin matrix 410.

Meanwhile, according to the present disclosure, a reflection area for reflecting the light emitted from the plurality of light sources 200 is provided on at least a portion of the top surface of the circuit board 100. Most of the light emitted from the light sources 200 is incident upward to the fluorescent material layer 400, but some of the light may be incident downward to the circuit board 100. Among the light, the light incident toward the circuit board 100 does not contribute to light emitting of the lamp 10, and thus, may act as a factor to deteriorate performance of the lamp 10. Thus, according to the present disclosure, as the reflection area is formed on at least a portion of the circuit board 100, the light, which has been incident from the plurality of light sources 200 to the circuit board 100, is allowed to be reflected and then incident to the fluorescent material layer 400 again. Thus, the deterioration in performance of the lamp 10 may be minimized. More preferably, the reflection area may have white color so as to maximize reflectivity in the reflection area.

According to the present disclosure, the lamp for an automobile, which has excellent flexibility and degree of freedom in design, may be manufactured.

Also, according to the present disclosure, the lamp for an automobile, which has excellent light uniformity when turned on, may be manufactured.

Also, according to the present disclosure, the lamp for an automobile, which satisfies the stop light distribution regulations and has excellent thermal resistance, yellowing resistance, durability, and reliability, may be manufactured.

Also, according to the present disclosure, the lamp for an automobile, which has the simplified structure to increase space utilization and has excellent productivity and economic feasibility, may be manufactured.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A lamp for an automobile, comprising:
   a circuit board;
   a plurality of light sources disposed on a top surface of the circuit board;
   an optical resin layer disposed on the top surface of the circuit board and covering the plurality of light sources; and
   a fluorescent material layer disposed on and in contact with a top surface of the optical resin layer,
   wherein the fluorescent material layer comprises a resin matrix and a fluorescent material dispersed within the resin matrix, and
   wherein a distance (P) between a pair of the light sources neighboring each other, a thickness (T1) of the optical resin layer, and a thickness (T2) of the fluorescent material layer satisfy $0.1 \leq (T1+T2) \leq 2.0$.

2. The lamp of claim 1, wherein the distance P and the thicknesses T1 and T2 satisfy $P=T1+T2$.

3. The lamp of claim 1, wherein a light-emission peak of each of the light sources has a wavelength of about 420 nm to about 470 nm.

4. The lamp of claim 1, wherein:
   the fluorescent material comprises a red fluorescent material having a size of about 1 μm to about 100 μm, and
   the red fluorescent material comprises one or more of a garnet-based fluorescent material, a silicate-based fluorescent material, a nitride-based fluorescent material, and an oxynitride-based fluorescent material.

5. The lamp of claim 1, wherein the fluorescent material layer comprises about 50 to 99.9 wt % of the resin matrix and about 0.1 to about 50 wt % of a red fluorescent material.

6. The lamp of claim 1, wherein each of the optical resin layer and the resin matrix comprises an addition reaction-type silicone resin composition including a methyl group-containing silicone composition and a curing catalyst.

7. The lamp of claim 6, wherein the addition reaction-type silicone resin composition comprises about 0.0001 to about 5 parts by weight of the curing catalyst per 100 parts by weight of the methyl group-containing silicone composition.

8. The lamp of claim 7, wherein the methyl group-containing silicone composition comprises about 65 wt % to about 85 wt % of methyl group-containing polysiloxane, about 13 wt % to about 30 wt % of a methyl group-containing chlorosilane compound, and about 1 wt % to about 8 wt % of methyl group-containing hydrogen polysiloxane.

9. The lamp of claim 1, wherein:
the fluorescent material has a refractive index of about 1.5 or higher, and
each of the optical resin layer and the resin matrix has a refractive index of about 1.3 to about 1.8.

10. The lamp of claim 9, wherein:
the fluorescent material has a refractive index of about 1.5 to about 2.5, and
each of the optical resin layer and the resin matrix has a refractive index of about 1.4 to about 1.5.

11. The lamp of claim 1, further comprising an optical filter member disposed over the fluorescent material layer and blocking a portion of a wavelength of a visible rays emitted from the fluorescent material layer.

12. The lamp of claim 1, wherein the fluorescent material layer further comprises a pattern area positioned at a surface portion of the fluorescent material layer and including a groove.

13. The lamp of claim 12, wherein the pattern area is disposed on an upper surface of the fluorescent material layer.

14. The lamp of claim 11, wherein the optical filter member comprises an inner lens or an outer lens.

15. An automobile comprising the lamp of claim 1.

16. The automobile of claim 15, wherein the lamp further comprises a reflection area disposed on a portion of the top surface of the circuit board and configured to reflect the light emitted from the plurality of light sources.

* * * * *